United States Patent [19]

Filley

[11] Patent Number: 4,872,625

[45] Date of Patent: Oct. 10, 1989

[54] UNIVERSAL MODULE ASSEMBLY FOR SPACE STRUCTURES

[76] Inventor: Charles C. Filley, 1207 Saxony, Houston, Tex. 77058

[21] Appl. No.: 717

[22] Filed: Jan. 6, 1987

Related U.S. Application Data

[63] Continuation-in-part of Ser. No. 635,635, Jul. 30, 1984, abandoned.

[51] Int. Cl.⁴ ............................................. B64G 1/10
[52] U.S. Cl. ..................................... 244/159; 52/79.4; 52/81; 52/DIG. 10; 244/161
[58] Field of Search ................. 244/158 R, 159, 161; 52/DIG. 10|81, 236.1, 79.4, 648; 220/5 A

[56] References Cited

U.S. PATENT DOCUMENTS

| | | | |
|---|---|---|---|
| 3,380,687 | 4/1968 | Wrench et al. | 244/158 R |
| 3,532,158 | 10/1970 | Hiebert | 52/DIG. 10 |
| 3,600,865 | 8/1971 | Vanich | 52/236.1 |
| 3,661,293 | 5/1972 | Gerhard et al. | 220/5 A |
| 3,707,813 | 1/1973 | Cymbrowtz | 52/DIG. 10 |
| 3,791,080 | 2/1974 | Sjoberg | 52/79.4 |
| 3,955,328 | 5/1976 | Lindsey | 52/DIG. 10 |
| 4,057,207 | 11/1977 | Hogan | 244/159 |
| 4,175,669 | 11/1979 | Householda et al. | 220/5 A |
| 4,295,317 | 10/1981 | Jensen | 52/236.1 |
| 4,384,692 | 5/1983 | Preukschat | 244/161 |
| 4,462,191 | 7/1984 | Poirer | 52/236.1 |
| 4,546,583 | 10/1985 | Hussar | 52/236.1 |
| 4,715,566 | 12/1987 | Nobles | 244/159 |

FOREIGN PATENT DOCUMENTS 196793  8/1986  European Pat. Off. ............ 244/161

OTHER PUBLICATIONS

"Space Station Architectural Elements and Issues Definition Study", Taylor & Associates, Inc., Sep. 25, 1984.

*Primary Examiner*—Galen L. Barefoot
*Attorney, Agent, or Firm*—William E. Shull

[57] ABSTRACT

A universal module assembly includes a pressure vessel having cylindrical side walls and curved end surfaces. A rigid external supporting framework is attached to the exterior of and surrounds the pressure vessel. The framework includes a main body portion disposed around the cylindrical side walls, and end portions covering the curved end surfaces of the pressure vessel. The main body portion of the framework is in the general configuration of a right hexagonal prism, and the end portions of the framework are generally frustoconical. The framework is provided with access ports on one or both of its end portions and/or on one or more sides of the main body portion to facilitate interconnecting two or more of the module assemblies end-to-end, end-to-side, or side-to-side. Vessels of interconnected module assemblies can be communicated with one another in a pressure-tight state. The module assemblies can be used singly, or connected together in moderate-sized groups or large clusters, to form a variety of habitable space structures. The module assemblies are compatible in size and shape with the payload bay of the Space Shuttle, so that up to seven module assemblies can be launched into orbit with each Shuttle trip.

21 Claims, 4 Drawing Sheets

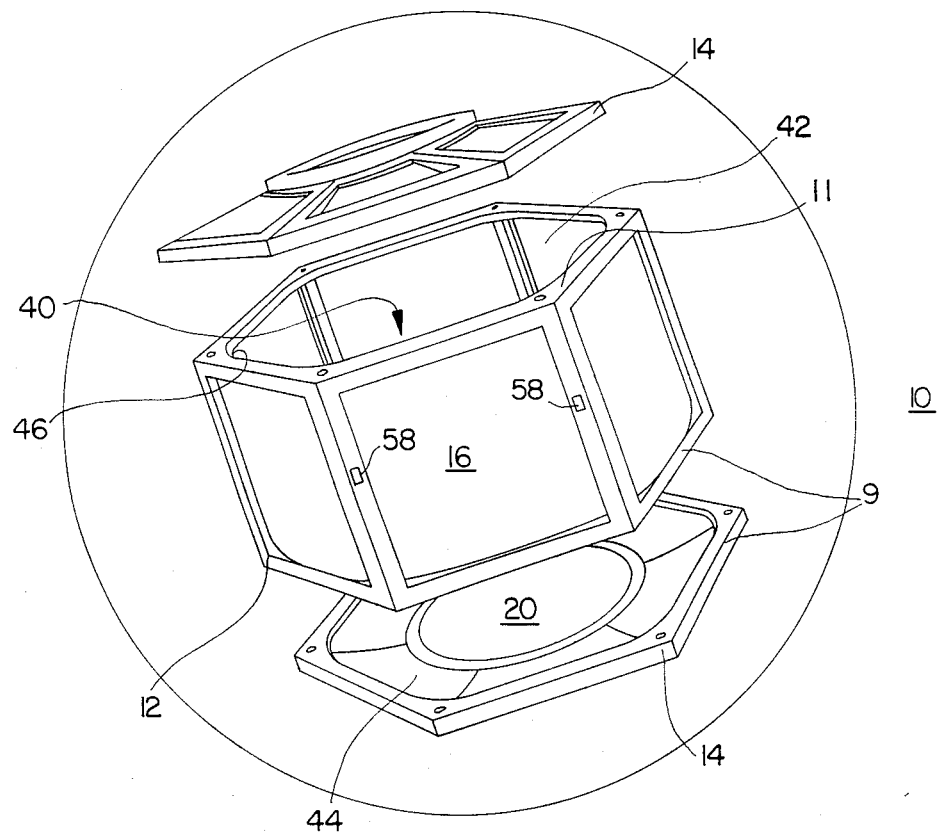
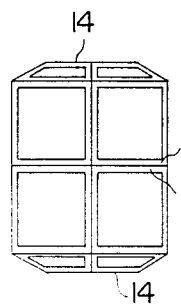
FIG. 2
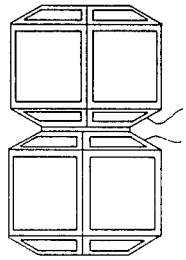
FIG. 3
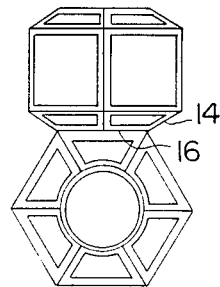
FIG. 4
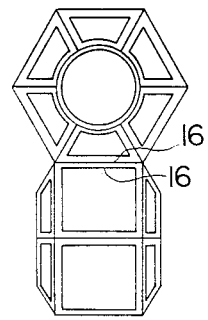
FIG. 5
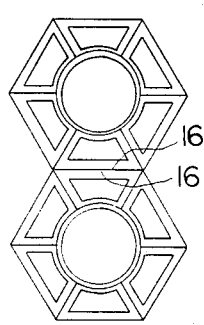
FIG. 6
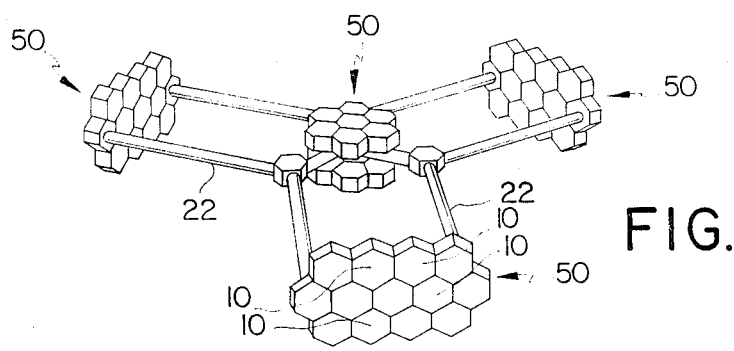
FIG. 11

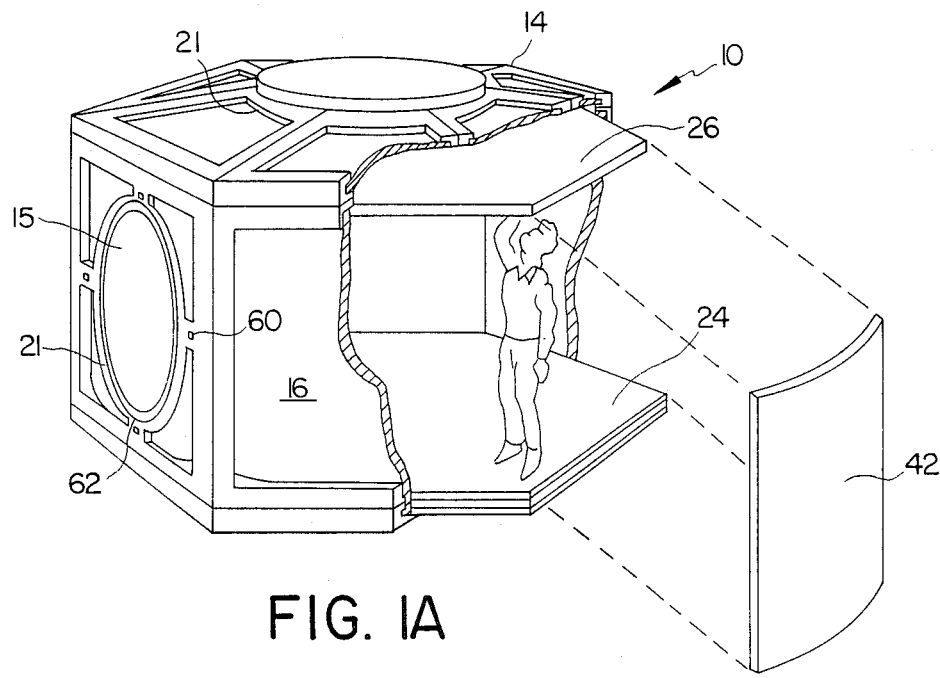
FIG. IA
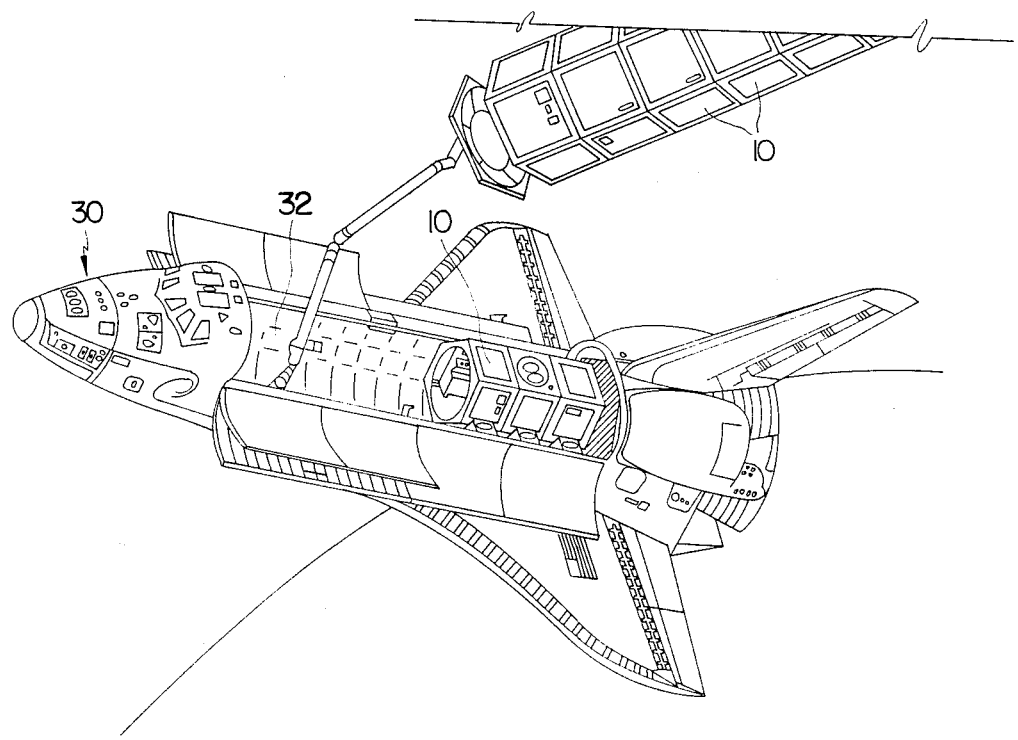
FIG. IB

UNIVERSAL MODULE ASSEMBLY FOR SPACE STRUCTURES

This is a continuation-in-part of my prior copending application Ser. No. 635,635 filed July 30, 1984, now abandoned.

FIELD OF THE INVENTION

The present invention relates in general to space enclosing structures, and more particularly to a universal module assembly for constructing space stations.

BACKGROUND OF THE INVENTION

At present, many of the world's nations are seeking access to the outer space environment. For some, the issue is national security, and for others, economic growth. While the United States has made access possible through development of the Space Shuttle, our leadership is increasingly challenged. Soviet shuttle and heavy lift launcher development, the French Ariane launch vehicle and Hermes "space plane", and efforts of other advanced-technology countries sharpen the intensity of competition in the near term. In parallel, the United States faces increasing budget deficits and a widening gap in balance of trade. It is with these realities in mind that the President and Congress have advanced the concept of United States Commercialization of Space—an endeavor to involve American industry in the development and utilization of the space environment. Private enterprise has been challenged to take a leading role in the nation's civilian space activities, to bring entrepreneurial inventiveness to bear in a marketplace of seemingly limitless potential.

While past governmental efforts in space have been primarily performance driven, it is now appropriate that a more cost-conscious path be pursued. Commercial programs require commonality and compatibility of equipment and systems, and lowered production costs to make them economically feasible. The proper mix of performance technology and cost-efficient application will insure America's sustained leadership in the exploration of space and provide the American people with more effective means of carrying out activities in that medium.

One area in which the foregoing inventiveness and leadership is required is the design and development of space enclosing structures, such as those commonly known as space stations. There have been a variety of designs proposed for the deployment of space stations. The earliest designs centered on the idea that the entire space station should be lifted into earth orbit in one launch. Such a space station is described, for example, in U.S. Pat. No. 3,169,725. Working within the restriction of only one launch, however, places severe size and weight limitations on the space station. An actual example of such a space station is Skylab. The early designs had a major drawback, in that they did not have the capability for expansion.

Attempts have been made to design single-launch space stations that are collapsible. One such design is shown in U.S. Pat. No. 3,169,725. The space station design contemplated therein folds up and is projected into orbit in its folded position. Upon reaching orbit, parts of the station inflate, and it unfolds to full deployment. Such a design would appear to be limited in its capabilities to undergo future expansion. Also, maintenance or replacement of modules would be quite difficult, especially if part of the station were inflatable.

Another single-launch design is shown in U.S. Pat. No. 3,332,640. As with other single-launch designs, this one suffers from the lack of ability to undergo future expansion, and the difficulty of maintenance and replacement of defective modules.

A more recent attempt (U.S. Pat. No. 4,057,207) has been the design of a space station comprised of modular components capable of being delivered into orbit by the Space Shuttle. The geometry of this modularly constructed space station calls for the modules to be truncated icosahedra, the truncations occurring where up to three pentangular pyramids about nonadjacent verticies have been removed from each icosahedron. Although the geometry of a truncated icosahedron allows limited flexibility for the ultimate shape or design of the space station, it would apparently create the problem of providing irregular interior surfaces within the space station since an icosahedron has twenty faces. Further, the modules do not appear to be flexible in their uses; rather, they are simply parts of a unitary space station design concept.

Structures intended for sustained occupation by humans in space are in essence pressure vessels, and their design requires a high degree of pressure-containing and supporting capability in order to avoid a potentially catastrophic loss of pressure in space. In the past, pressure vessels which have required rigid structural supporting frameworks have typically provided such frameworks on the interior of the vessels due to external fluid flow considerations. Examples of pressure vessels having such internalized supporting frameworks include submarines, airplanes, and launch vehicles or rockets. While such pressure vessels are suitable for their intended purposes, their internalized framework designs are unnecessary for habitable space structures, since such fluid flow considerations play a lesser role in space and since such internal frameworks would occupy valuable space inside the pressure vessel which can be better utilized for other purposes.

SUMMARY OF THE INVENTION

Applicant has developed a habitable universal module assembly that may be used as a fundamental building block for many applications foreseen in this country's future space endeavors. The module assembly of the present invention is compatible with NASA's Space Transportation System ("STS"), which includes the Space Shuttle, and may be used singly or in multiples to construct a variety of large space structures. These may include, for example, Space Shuttle-borne experiment or personnel carriers, free-flying platforms, initial and advanced space station assemblies, and lunar colony or Mars mission habitats. Terrestrial uses exist as well. Quantity production and broad application of this versatile modular concept offers the potential for order-of-magnitude reductions in unit cost. Moreover, the availability of such hardware may well accelerate further commercialization efforts and use of the STS.

The universal module assembly of the present invention utilizes an external structural framework in the general shape of a modified right hexagonal prism, in combination with a pressure vessel roughly approximating a sphere. One or both of the top and bottom portions, or end cones, is configured for pressure handling, while interior false ceiling and floor sections isolate ducting, plumbing, wiring, and the like. The end cones are shaped generally like truncated, hexagonally-based pyramids. Because each module roughly approximates a sphere or, more closely, a cylinder with elliptical or hemispherical ends, it exhibits superior pressure containment capabilities than a standard right hexagonal prism. The external framework provides a rigid supporting means for the pressure vessel therewithin, and facilitates modular interconnection between assemblies. By externalizing the supporting framework for the pressure vessel, usable space inside the pressure vessel is maximized. Each module assembly is compatible in size with the Space Shuttle's payload bay. Such sizing permits the orbital emplacement of as many as seven module assemblies per STS launch, and readily conforms to the Space Shuttle's center of gravity limitations.

The module assemblies of the present invention may be interconnected on any of their eight major surfaces, that is, side-to-side, end-to-end, or side-to-end. Such means of interconnectivity offers increased flexibility and versatility in determining the spacecraft's configuration and physical layout. For example, the module assemblies can be arranged to form a multi-layered, beehive effect, or linked together to form a single-layered array or chain. Each module assembly's face is constructed such that interchangeable siding may be selected—either open, closed off, or accommodating a circular access port. A circular access port available for a side panel is identical in size to ports contained within the end cones. Bending moments when module assemblies are connected are reduced as a consequence of the broad surface of module assembly interface.

With such qualities, the module assembly can be employed in a multi-mission role. While the module assembly has been developed to provide a high measure of interconnectivity and configuration flexibility, it can be used singly as well in the STS and other environs. Many of the attributes discussed hereinafter, however, are those enjoyed by a number of module assemblies which have been joined together to form a relatively large and habitable space structure.

A more densely packed modularly constructed habitable space structure using the universal module assembly of the present invention has other advantages over prior art structures. For example, it has an inherently high ratio of usable internal floor area to total volume, and an inherently low ratio of exposed external surface area to total volume. The space structure can be easily modularly erected, and expanded practically without limitation, in space. It can be adapted for simulating gravity to various degrees for its occupants, as well as for providing accommodations for zero-gravity conditions for experimentation and laboratory purposes.

The use of cylindrical tubes or the like to join one group or "cluster" of interconnected module assemblies to another enhances the versatility of the present invention even further. A number of groups or clusters of module assemblies joined together by such members allows housing to be in one cluster, laboratories to be in another cluster, docking facilities in another cluster, warehousing in still another cluster, and so on.

Should any universal module assembly become damaged, it can easily be replaced with a new one, since one module assembly is substantially identical to the others.

These and other advantages of the present invention will become readily apparent when the following description and claims are read and considered in conjunction with reference to the accompanying drawings.

BRIEF DESCRIPTION OF THE DRAWINGS

FIG. 1 is an exploded isometric view of a universal module assembly of the present invention;

FIG. 1A is a partially cut-away isometric view of the module assembly of FIG. 1, with a schematic representation of an occupant standing on the floor of the module assembly for size comparison purposes;

FIG. 1B is an isometric view of the Space Shuttle in orbit, with its payload bay doors open and several module assemblies still in the bay;

FIG. 2 is an elevation view of two universal module assemblies of the present invention connected at their hexagonal faces, in the absence of an end cone at such faces;

FIG. 3 is an elevation view of two universal module assemblies of FIG. 1 connected at their end cones;

FIG. 4 is an elevation view of two universal module assemblies of FIG. 1 connected at an end cone of one and a circular access port within the side rectangular face of the other;

FIG. 5 is an elevation view of two universal module assemblies of FIG. 1 connected at their side rectangular faces, with the cylindrical axis of one module assembly being rotated 90° with respect to that of the other;

FIG. 6 is a plan view of two universal module assemblies of FIG. 1 connected at their side rectangular faces, with their cylindrical axes being parallel to one another;

FIG. 11 is an isometric view of one possible advanced space station design.

DETAILED DESCRIPTION OF THE PREFERRED EMBODIMENT

Figure 7:
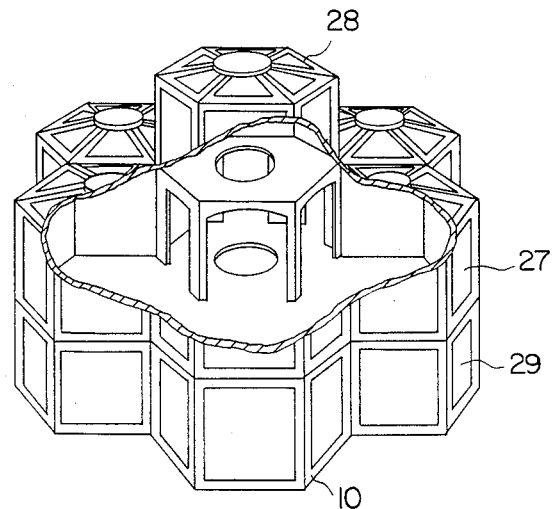
FIG. 7 is an isometric, partially cut-away view of one possible space station design using fifteen module assemblies in a condominium-style arrangement.

Referring now to the drawings, each universal module assembly of the present invention comprises a modified right hexagonal prism structure 10. Structure 10 includes a rigid external framework 9 having a main body portion 12, and may be provided with generally frustoconical-shaped top and bottom or end sections 14. Each top and bottom or end cone or section 14 is generally in the shape of a truncated, hexagonally-based pyramid. Framework 9 can thus be said to include a body portion capped with one or both of the end cone portions.

A pressure vessel 40 is disposed within the external framework 9. Pressure vessel 40 includes side walls made up of preferably six interconnected side panels 42, and top and bottom or end surfaces made up of preferably six end panels 44. Side panels 42 are curved inwardly, as shown in FIG. 1A and at 46 in FIG. 1, such that sharp corners are eliminated at the juncture between adjacent panels 42, and a smooth, continuous transition surface obtained. End panels 44 are curved to provide a smooth, continuous dome effect when connected together. A module assembly 10 of such configuration roughly approximates a smooth cylinder having elliptical or hemispherical ends. A cylindrical body with elliptical or hemispherical ends is a typical design for pressure vessels. Unlike the typical prior art designs for pressure vessels requiring supporting frameworks, however, the supporting framework for the pressure vessel of applicant's universal module assembly is on the outside, not on the inside.

Each module assembly 10 is compatible in size and shape with the Space Shuttle's payload bay, preferably measuring 14.5 feet diametrically from apex to apex and 12.5 feet from side to side. Each rectangular face 16 of a module assembly 10 is preferably 7.25 feet square, and each module assembly 10 is preferably approximately 11 feet in length with end sections 14 attached Weighing between 3,500 to 4,000 pounds, each module assembly contains about 1,100 cubic feet of volume and provides a usable floor area of about 130 square feet, approximately that of a medium-sized bedroom. FIG. 1A illustrates the approximate sizing of module assembly 10 in relation to an occupant. This preferred sizing allows as many as seven module assemblies 10 to be placed in orbit with each Space Shuttle trip. See, for example, FIG. 1B, which illustrates the Space Shuttle 30 in orbit, with several module assemblies 10 still in the payload bay 32 prior to deployment.

It is anticipated that a highly efficient volumetric load factor aboard the Space Shuttle will be realized by the present invention. While a one-piece circular cylindrical space station segment efficiently utilizes the payload bay volume, the potential of launching up to seven module assemblies 10 with each launch, coupled with the ability to strategically place them with respect to the Space Shuttle's center of gravity limitations, should result in an equivalent, if not improved, capability.

The module assemblies 10 can be interconnected in a variety of ways. Two or more module assemblies 10 may be interconnected at their hexagonal faces 11 in the absence of end sections 14 at such faces, as shown in FIG. 2, thereby creating a continuous cylindrical member of predetermined length between its end sections 14. The module assemblies 10 can be interconnected at their end sections 14, as shown in FIG. 3. The module assemblies 10 can further be interconnected between the end section 14 of one, and a circular access port (see below) in the rectangular face 16 of the other, as shown in FIG. 4. The module assemblies 10 may also be interconnected between their rectangular faces 16, with the cylindrical axes of such module assemblies being either perpendicular or parallel to one another, as shown in FIGS. 5 and 6, respectively. Such interconnective flexibility is basic to the modified right hexagonal prism structure of the external framework 9 of the present invention and is enhanced by constructing each module assembly 10 such that the siding or panel member 42 for each rectangular face 16 is both optional and interchangeable. For example, any rectangular face 16 may be open, closed, windowed, airlocked, or provided with a circular access port 15 (see FIG. 1A), as desired. Such a circular access port 15 is preferably identical to the circular access port 20 of end section 14. When the module assemblies 10 are connected at their circular access ports 15, 20 or their rectangular faces 16 as shown in FIGS. 3 through 6, the frame members 21 surrounding such ports, and the frame members around the rectangular faces 16, provide a relatively large, flat surface area for securely joining the module assemblies together. Of course, the module assemblies can be connected together at their circular access ports by intermediate tubular members, or the like.

The interconnectivity of the module assemblies allows the construction of a relatively large and inhabitable space structure of any desired configuration, capable of being readily expanded in size to meet the needs of its occupants. Moreover, the interconnectivity enables the module assemblies to be densely packed together, thereby providing the resulting space structure with additional benefits. A large, internal volume is enclosed within the space structure, while exposed external surface area is minimized. Further, as opposed to space stations composed of primarily circular cylindrical shapes, the volume enclosed by the module assemblies 10 is of greater utility. For example, a 40 foot long circular cylindrical member having a diameter of 14.5 feet would enclose a total volume of about 6600 cubic feet. Assuming, however, that a planar member would have to be added within the cylindrical body to create a floor, the actual usable floor area within the cylindrical member would be approximately 13.0 feet by 40 feet, or 520 square feet. By comparison, four module assemblies 10 can be interconnected at their rectangular faces 16 in a single-tiered configuration to enclose a total internal volume of about 4400 cubic feet. Assuming that the floor 24 and ceiling 26 within the module assemblies 10 are located at the interfaces between the end sections 14 and the main body portion 12 of framework 9 (FIG. 1A), the usable floor area within the four connected module assemblies 10 will also be approximately 520 square feet. Thus, it can be seen that the same net usable floor area has been achieved while reducing the volume of enclosed space by 33%. The greater utility of enclosed crew space with the present invention as compared to the circular cylindrical member offers a substantial reduction in air supply requirements. Further, by limiting air supply only to inhabited areas, savings are also realized in air flow capacity, air purification, and temperature and humidity control requirements.

Moreover, the module assemblies of the present invention, with large interconnective openings, provide a spatial continuity for the resulting space structure that is enhanced psychologically and is practically useful in terms of functional segregation of space, crew productivity, bulk transfer and traffic flow. Little space is lost in transitioning from one module assembly to another, and inaccessible space is minimized. Shorter lengths of ducting, tubing and wire bundles are made possible by modular three-way branching between module assemblies. A condominium style of design, described in more detail hereinafter, is substituted for more confining tubular layouts.

Interfaces of 70 inches or more in diameter between interconnected module assemblies reduce congestion and permit movement of large pieces of hardware. Transfer of equipment to another location prior to downloading a module assembly from the space station may reduce the need for certain logistical STS flights. Then too, the rigidity of structure offered by broad contact surfaces between module assemblies lowers bending moments and reduces vibrations that may affect instrumentation sensitivity, leak rates, and connector wear.

A layout using the module assemblies of the present invention provides for the appropriate allocationing of space to specific functions and encourages placement of related activities in adjacent module assemblies. Privacy is enhanced and isolation from undesirable noise, light, and odors is improved. Traffic flow through laboratories, for example, can be minimized and an increased measure of safety can be realized through the ability to completely close off designated areas. It may prove to be advantageous to environmentally decondition or even evacuate certain autonomous operational facilities or storage areas to conserve environmental stores.

The emplacement of structures in space for extended periods requires that careful consideration be given to environmental hazards. Extreme swings in temperature, radiation, ionization of materials, and both natural and man-made debris must all be dealt with. Use of the module assemblies of the present invention offers a very significant advantage over most other habitable structures in minimizing the adverse effects of such hazards. The unique configuration and structure of the module assemblies of the present invention permit them to be closely packed together, thus partially covering and protecting adjacent module assemblies. Furthermore, the exposed surface area of optimally coupled module assemblies 10 is considerably less than that of circular cylindrical space station segments of equivalent volume. The module assemblies 10 of the present invention approximate a spheroid, the best shape for limiting exposed surface area with respect to enclosed volume. The exposed surface area of circular cylindrical segments can be as much as 30% to 40% greater than that of optimally coupled module assemblies 10, and the disparity increases as the size of the space structure increases. In addition, configurations may be selected such that a large proportion of the space structure's exposed external surface is oriented toward the earth—a naturally protective means with respect to radiation and debris hazards. The reduced exposed external surface area of the module assemblies 10 when densely packed results in a space structure with reduced thermal loss, minimized surface material ionization, and more crew protection. This results as well in reduced need for thermal insulation and debris shielding.

The external framework 9 serves several purposes. Besides providing structural integrity and support for the pressure vessel mounted within the framework and facilitating interconnection of module assemblies, the external framework offers a partial shield against damage to the pressure vessel caused by drifting debris. The flat-surfaced framework can also serve as attachment points, for example as shown at 58 in FIG. 1, for debris shielding and externally mounted hardware. Materials selected for the framework and pressure vessel may include, for example, aluminum and a variety of composites, and will be optimized toward lowering corrosion, radiation penetration, and thermal loss while providing pressure containment and debris rupture resistance.

End-to-end connection of module assemblies and end cone emplacement may be carried out prior to launch at either field locations or at the launch site. It is envisioned that side-to-side and side-to-end connection of module assemblies will be accomplished by remote manipulation utilizing the Space Shuttle's mechanical arm as well as some extravehicular activity. The frameworks 9 of the module assemblies 10 of the present invention may be provided with locking means such as over-center cam latches, self-centering mechanisms, and the like which are well known in the art, for example as indicated at 60 in FIG. 1A, to facilitate interconnection of module assemblies. Sealing means such as inflatable O-rings or the like, for example as indicated at 62 in FIG. 1A, are provided at the interfaces between the frame members surrounding the circular access ports to ensure a pressure-tight seal between the module assemblies. Of course, such sealing means are also provided between the frame members around the faces of the module assemblies when they are connected together at their hexagonal faces as shown in FIG. 2, and when they are connected together at their rectangular faces as shown in FIGS. 5 and 6, which may be effected without any circular access ports at such faces.

The universal module assembly 10 of the present invention provides a space structure design flexibility heretofore unknown. Single and multiple module assemblies 10 may be used in conjunction with the STS for mid-deck expansion, as payload bay experiment and personnel carriers, as space station resupply modules, and as fundamental building blocks for the space station itself. The space station may be configured in a variety of layouts, ultimately determined by equipment and staffing requirements and crew protection considerations.

Figure 8A:
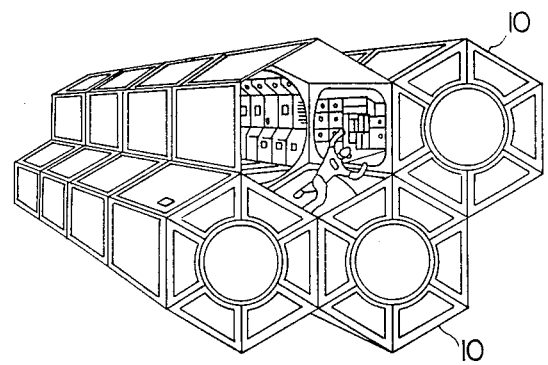
FIGS. 8A and 8B are partially cut-away perspective and isometric views, respectively, illustrating alternative condominium-style space station designs using sixteen module assemblies.
Figure 8B:
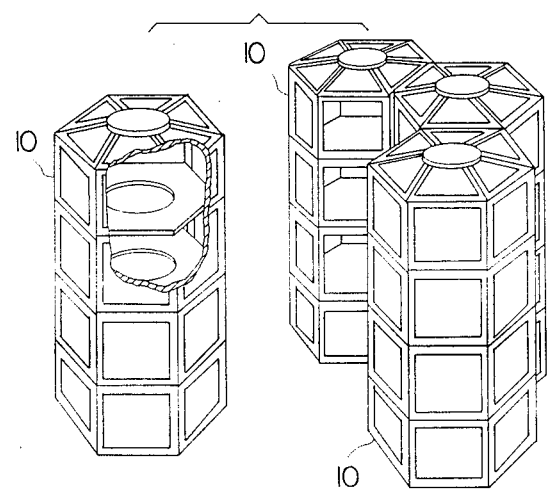

One possible space station configuration is illustrated in FIG. 7. It utilizes fifteen module assemblies 10 and offers a two-tiered condominium-styled layout with, for example, a habitability deck 27 above and a sensor and laboratory deck 29 below. The single module assembly attached at the top, as shown at 28, may serve as a navigation, extravehicular activity storage, and mast egress area. Other possible space station configurations are illustrated in FIGS. 8A and 8B. They utilize sixteen module assemblies, and provide either a longitudinal tubular (FIG. 8A) or multi-tiered condominium (FIG. 8B) style of orientation. All of these space station configurations offer the advantages discussed above of significantly increasing usable internal floor area while substantially reducing enclosed volume, and substantially reducing exposed surface area.

The module assembly 10 of the present invention can also be utilized in a variety of possible configurations in the development of larger and more advanced space stations. Both rotational and non-rotational groups or clusters of module assemblies can be combined to provide both partial and micro-gravity. For example, grouping of module assemblies extended some 100 feet from the center of rotation provides about a third of a gravity at three to four revolutions per minute. A single module assembly at the center of rotation provides the transition to the non-rotating center segment. At greater radii and lower rates of rotation, the station may be expanded to colony-sized proportions with additional levels of synthesized gravity.

One example of such an advanced space station configuration is shown in FIG. 11. Tubular members 22 allow the interconnection of multiple clusters 50 of module assemblies 10. If desired, each cluster 50 can be individually designated to serve a particular purpose such as housing, laboratory space, storage, environmental control, and the like.

Figure 9:
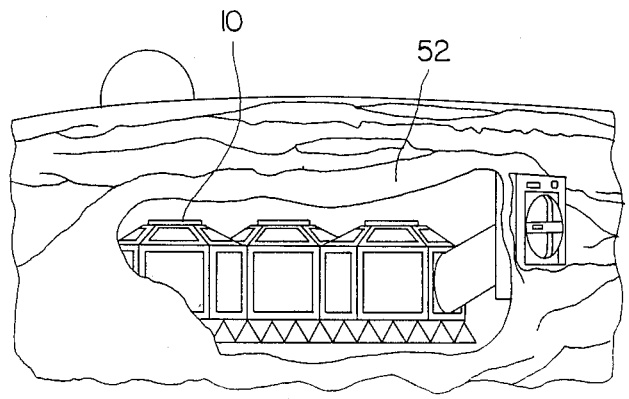
FIG. 9 is a partially cut-away view illustrating use of the module assemblies for an underground lunar colony.
Figure 10:
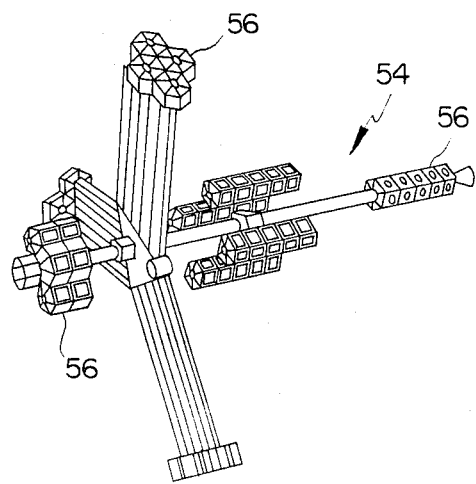
FIG. 10 is an isometric view of one possible form of an interplanetary transportation vehicle using module assemblies of the present invention.

The universal module assembly 10 can also be used in a variety of other applications including lunar colony (FIG. 9) and Mars visitation programs (FIG. 10). FIG. 9 illustrates just one example of a lunar colony comprising a single-tiered group of interconnected module assemblies 10 below the moon's surface 52. Similarly, FIG. 10 illustrates just one example of an interplanetary transportation vehicle 54 utilizing interconnected groups or clusters 56 of module assemblies 10, of various configurations. A partial listing of other possible applications of the module assembly of the present invention includes the following: manned tugs and lunar ferries; geosynchronous sorties and lunar orbital stations; power storage packages or fuel depots; and utilization in certain specialized terrestrial and under-sea environments.

Very significant cost savings should be realized through utilization of the universal module assemblies of the present invention for manned space operations. The potential for the module assembly's single design to serve a multitude of applications can eliminate design trade and development costs at the outset of each program. Repetitive quantity manufacturing of the module assemblies should dramatically reduce per-unit production expense and bring about a more schedule-sensitive availability of hardware. Costs will be more predictable in determining budgets for new programs.

Commonality within elements of a specific program and between programs, as will be obtained through the present invention, offers the potential for use of previously developed experience and the sharing of support equipment and procedures. For instance, the construction of a Mars exploration vehicle in the vicinity of, and utilizing the same components as, a manned space station could yield significant savings in both cost and schedule. In adopting concepts such as the universal module assembly of the present invention, where economy, commonality, and flexibility are combined, current schedules for space exploration may be accelerated and a shift in motivational emphasis achieved. The use of available common hardware may encourage the natural progression of a set of on-going exploratory initiatives. Even projects that to date have received only cursory consideration may be more readily flown.

Another factor for consideration is that of optimizing STS traffic modelling. Many of the advantages offered by the present invention can assist in assuring that the STS is efficiently utilized. The ability to change out bulk equipment from module assembly to module assembly on orbit may preclude the need for additional flights. Insuring a high-load factor through strategic module assembly placement in the Space Shuttle's payload bay, launching several module assemblies for different purposes, and reductions in need for environmental resupply will all reduce operational costs. On the other hand, an accelerated schedule of programs and the onset of new projects will assure a full schedule for the STS.

Common and highly flexible construction techniques as facilitated by the present invention allow decisions related to specific spacecraft configuration to be deferred until much closer to the date of launch. Similar to a train that is manifested shortly before leaving the station, spacecraft layout may be modified to fit a more up-to-date recognition of program requirements. Equipment changes and adjusted staffing levels are more readily accommodated.

From the foregoing, it will be appreciated that the present invention provides an impetus toward early achievement of many of our nation's efforts in space, and a means by which the American people can sustain into the future the role of leadership in that medium which they have assumed over the past several decades.

Since many possible embodiments may be made of the present invention without departing from its spirit and scope, it is to be understood that all matter herein set forth or shown in the accompanying drawings is to be interpreted as illustrative and not in a limiting sense.

I claim:

1. A universal module assembly, comprising:
a pressure vessel having cylindrical side walls and curved end surfaces; and
framework means integrally attached to and contiguous with the exterior of and surrounding the pressure vessel for providing the primary structural rigidity to the module assembly and the primary structural support from the pressure vessel, and for facilitating the interconnection of said framework means of said module assembly with the framework means of another like module assembly, said framework means including a body portion disposed around said cylindrical side walls and end portions covering said curved end surface of said pressure vessel, said body portion of said framework means being in the general configuration of a right hexagonal prism having six rectangular faces and two hexagonal faces, and said end portions of said framework means are generally frustoconical in configuration.

2. A universal module assembly according to claim 1, wherein said cylindrical side walls comprise a plurality of releasably interconnected curved side wall panels forming the side walls of said pressure vessel, each of said wall panels being individually removable from said assembly, whereby said panels can be alternatively removed and entirely left out from said assembly, thereby opening up said pressure vessel, or replaced with another of said wall panels of like configuration.

3. A universal module assembly according to claim 2, wherein each of said side wall panels can be alternatively and optionally provided with a window, an air lock, or other desired hardware.

4. A universal module assembly according to claim 1, wherein said end portions of said framework means generally comprise truncated, hexagonally based pyramids.

5. A universal module assembly according to claim 1, wherein said end portions are attached to said body portion of said framework means at its hexagonal faces.

6. A universal module assembly according to claim 5, and further including interconnecting means disposed on said framework means for attaching said module assembly to another of said module assemblies and for providing pressure-tight communication between the pressure vessels of the two module assemblies.

7. A universal module assembly according to claim 6, wherein said interconnecting means includes an access port on at least one end portion of said framework means.

8. A universal module assembly according to claim 7, wherein said access port is substantially circular and is disposed at the apex of said frustoconical end portion of said framework means.

9. A universal module assembly according to claim 6, wherein said interconnecting means includes an access port on at least one rectangular side of said body portion of said framework means.

10. A universal module assembly according to claim 9, wherein said access port is substantially circular.

11. A universal module assembly according to claim 6, wherein said interconnecting means includes a substantially circular access port on at least one rectangular side of said body portion of said framework means, and a substantially circular access port disposed at the apex of at least one of said frustoconical end portions of said framework means, said access ports being substantially identical in size to one another.

12. A universal module assembly according to claim 6, wherein said interconnecting means are located on said module assembly and on said other of said module assemblies so that the two module assemblies can be alternatively interconnected end-to-end, side-to-end, or side-to-side.

13. A universal module assembly according to claim 5, wherein said body portion of said framework means includes a plurality of right hexagonal prism structures attached end to end at their adjacent hexagonal faces, and said end portions of said framework means comprise end cones attached to the hexagonal faces of the prism structures on the opposite ends of said body portion of said framework means.

14. A universal module assembly according to claim 1, wherein said module assembly is sized such that up to seven such module assemblies can be placed within the payload bay of the Space Shuttle and launched into orbit along with it.

15. A universal module assembly according to claim 1, wherein said framework means comprises attachment points for debris shielding or other desired hardware external to said module assembly.

16. A space enclosing structure for deployment outside of earth's atmosphere providing a habitat for humans, comprising:
a plurality of module assemblies, each said module assembly having an external frame forming a right hexagonal prism having a hexagonally-based, truncated pyramid extending from each end of said right hexagonal prism, each said external frame being mounted around a pressure vessel having a plurality of walls each integrally attached to and contiguous with said frame, said frame providing the primary structural rigidity to such module assembly and the primary structural support for the pressure vessel, said walls of said pressure vessel being curved such that the space enclosed therein approximates a cylinder with curved ends, and means for connecting said module assemblies together alternatively end-to-end, side-to-side, or end-to-side.

17. A space enclosing structure according to claim 16, wherein said module assemblies are connected together in a single-tiered array.

18. A space enclosing structure according to claim 16, wherein said right hexagonal prism of said external frames of said module assemblies between said hexagonally-based, truncated pyramid include a plurality of individual right hexagonal prism segments attached end to end at their adjacent hexagonal faces, and wherein said module assemblies are connected together in a condominium configuration.

19. A space enclosing structure according to claim 18, wherein the condominium configuration is a multi-tiered style.

20. A space enclosing structure according to claim 18, wherein the condominium configuration is an elongated-tube style.

21. A universal module assembly, comprising:
a pressure vessel having (a) a plurality of releasably interconnected curved side walls panels forming cylindrical side walls, each of said side wall panels being individually removable from said assembly and all of them being interchangeable with one another, and (b) curved end surfaces;
an external framework integrally attached to and contiguous with the exterior of and surrounding the pressure vessel, the framework providing the primary structural rigidity to such module assembly and the primary structural support for the pressure vessel and including (a) a right hexagonal prism structure around the cylindrical side walls of the pressure vessel, and (b) end cones in the general shape of hexagonally-based, truncated pyramids extending from each hexagonal face of the prism structure and covering the curved end surfaces of the pressure vessel;
a circular end access port mounted at the apex of one of the end cones; and
a circular side access port, substantially identical in size to the end access port, mounted in one of the side rectangular faces of the prism structure.

* * * * *